Patented Feb. 18, 1936

2,030,867

UNITED STATES PATENT OFFICE 2,030,867

ART OF REMOVING METALS AS VOLATILE CHLORIDES FROM ORES AND OTHER MATTERS CONTAINING THE SAME

Charles Hart, Chester, Pa., assignor of one-half to Peter Shields, Washington, D. C.

No Drawing. Application February 14, 1934, Serial No. 711,280

7 Claims. (Cl. 75—17)

The present invention relates to a procedure in which the iron in an ore or other matter may be brought under controlled conditions into a volatile chloride form, together with the removal of the iron in such volatile form.

A further feature of the invention is the removal, under controlled conditions, of nickel from ores and other matters, in volatile form; and/or the separation of iron and nickel from an ore or other matter and from one another.

The invention is likewise employable for separating metals such as chromium, nickel and iron from one another, and is particularly valuable in the exploitation of ores containing such metals in the combined state, usually as simple or complex oxides or oxide salts. In my prior Patent 1,826,932 and its reissue 18,609, a procedure is described for enriching ores which contain these metals with respect to the relative chromium and nickel contents thereof. The Cuban laterite ore described in that patent is of varying composition with respect to the proportions of iron, chromium, nickel, and other metals and metalloids such as the silicon and aluminum present in oxide form as gangue.

The present invention involves a departure from the procedures set out in the aforesaid patent, in that means is also afforded for regulating the percentage of nickel with respect to the percentage of chromium which is left with the gangue during the separation operation, and means are provided for accomplishing a regulated chlorination of the iron without the conversion of gangue matters to volatile form. This is accomplished in conjunction with the maintenance of control conditions by which the iron content may be determined, and by which the percentages of the several valuable ingredients may be modified as required for the production of the final alloy of predetermined composition.

When the proportion of nickel in the ore or other matter to be separated is higher than that required for producing a desired nickel alloy, with respect to its relationship to the content of other metals in the matter, it is proposed, according to the present invention, to eliminate a porion of the nickel and recover it as a valuable by-product. When the nickel content is insufficient, it is proposed to separate and recover the nickel from one portion of the ore, and to reincorporate such nickel with the metals of another portion of the ore. In this way, the first portion of the ore may be smelted to produce one low-nickel alloy; while the second portion may be smelted to produce a high-nickel alloy, usually with iron and/or chromium, of the predetermined composition.

It is found, further, that the treatment according to the present invention is of advantage owing to the possibilities of selectively separating the residue after treatment by an ordinary magnetic or gravity operation; although such a separation is not economically feasible with many of the original matters, such for example as the Cuban laterite ore.

A particular feature of the present invention is the provision of means for accomplishing a proportioning of not only the nickel, but also the iron, which is left with the residue; and also in producing a definite separation of the removed iron and nickel into masses which are predominantly iron and predominantly nickel with respect to the metal base thereof. It has been found that such a separation operation can be accomplished by a chlorinating procedure of the general character set out in my aforesaid patent, but differing therefrom with respect to the condition of the material at contact with the chlorine, the temperatures employed for the chlorination and volatilization, the conditions of separation of the evolved chlorides, and in the possibility of depositing the iron directly as an oxide.

A further feature of the invention is the use of a procedure including the maintenance of the evolved vapors at a high temperature, followed by a slow reduction of the temperature thereof while permitting deposit of separated solid or liquid matters, as a type of fractional condensation; whereby a substantial separation of the evolved gases into deposited masses of selectively controllable composition with respect to the metal base involved is possible.

Owing to the great similarity in behavior of nickel and cobalt under the conditions described below, these elements operate in an almost identical manner, and the cobalt is reduced with, chlorinated with, evolved with, and separated with the nickel; and hence it will be understood that where reference is made herein to "nickel", the word will be understood to include cobalt also. Furthermore, since many of the matters which can be treated by the present procedure contain but small quantities of cobalt, and the operations of separating the cobalt from the nickel are sometimes undesirable for economic reasons, the cobalt may be considered as cooperating with the nickel in the final material produced, and in essence as constituting a part of the "nickel" content thereof.

It is desirable, in all instances, to have the matter which is undergoing treatment in an anhydrous condition, as the presence of water appears to affect the course of the chemical reactions. For this purpose, a preliminary calcining or drying operation is understood to be included in all cases. In some instances, this calcining is a part of a sponging or "pre-reducing" operation which of itself has a valuable effect in the control of the course of the separation.

It will be understood that the procedure is employable for separating or parting various aggregates of material which contain the metals iron and nickel, usually in association with other metals and metalloids, and is applicable in general to iron-bearing matters such as the aforesaid laterite ores of Cuba and Puerto Rico, and the similar ores of Russia; to impure bauxites, clay, greensands; to nickel-bearing ores of Canada and Korea; and other like matters, as well as to the parting of such metals when present in elemental condition in association with one another.

It will be understood that the following examples may be employed with many different matters as original sources containing the metals in elemental, oxide or salt form, although specifically illustrated with respect to particular types of ores.

*Example I*

A dry Cuban laterite ore is subjected to a low temperature sponging (at around 1000 degrees C.) in the presence of a restricted quantity of carbon, so that a portion of the iron oxide content thereof is reduced to elemental iron, and likewise a portion of the nickel (usually present as garnierite) is reduced to the elemental form. The chromium and iron present in chromite remain substantially unaffected, along with a further portion of the iron which appears to be present as oxide but is not reduced under the conditions stated. The quantity of carbon employed is closely regulated, so that no great excess of carbon will be contained in the sponge as the latter is advanced for the chlorination operation. The sponge, while still hot and hence free from combined water or adherent water vapor, is brought into contact with chlorine. This is preferably done by causing a curtain of the sponge to fall across the gas-outlet end of a rotary furnace. The sponge is then caught by the furnace walls and is advanced in countercurrent to the gas flow and discharged adjacent the gas inlet as a residue. The admitted gas is preferably chlorine at a pressure slightly above atmospheric. The temperature in the furnace is maintained between 400 and 900 degrees C. The exact temperature is regulated according to the time of treatment, so that the desired proportions of iron and nickel are driven off. It has been found that at 475 degrees, nearly 90 percent of the elemental iron of the sponge is attacked and driven off in the form of ferric chloride. At a temperature of 800 degrees, about 61 percent of the elemental nickel is similarly driven off; while at temperatures of 475 degrees C. and below, only a relatively small portion of the nickel is caused to volatilize from the sponge. The unreduced oxides in the sponge are but little affected at temperatures up to 700 degrees. Iron in the form of oxide is only driven off to the extent of about 6 percent at 700 degrees; while nickel in the form of oxide shows an apparent gain of weight in the sponge or ore, owing to the substitution of chlorine for oxygen up to 700 degrees, and there is very little escape of nickel chloride.

The control of the heat, of the chlorine admission, and of the time of treatment, therefore, enables the operator to drive off from the pre-reduced ore or sponge determinable proportions of iron and nickel in the form of chlorides, while the remaining iron and nickel are carried forward and discharged with the general residue containing the chromium content and the gangue. By restricting the quantity of carbon employed for the pre-reduction, it is found that the temperatures employed lead to substantially no chlorination of the silica and alumina occurring in the gangue, although an apparent change or modification occurs in the ore which permits a magnetic or gravity separation of an enriched portion containing iron, chromium and nickel. The heating and chlorinating operation is not apparently attended by the formation of carbonyls, possibly by reason of the relatively low temperature at which such compounds are decomposed, and the substantial absence of water vapor and excess carbon. The absence of water vapor also appears to prevent the formation and retention of any great quantities of iron as ferrous chloride.

The evolved vapors contain ferric and nickel chlorides. The preferred manner of handling such vapors is to maintain their temperature until they have been passed into a cooling chamber which is maintained at temperatures from 420 to 780 degrees C. The nickel chloride then separates and is deposited in this chamber, while the iron chloride vapor continues forward through the outlet of such a chamber. The temperature of the iron chloride facilitates the contacting of it directly with oxygen gas or air in heated condition, resulting in the displacement of the chlorine in the ferric chloride and its replacement by oxygen. The iron oxide formed immediately deposits without reduction of temperature being required, and is separated from the remaining gas which contains free chorine at a high temperature. This free chlorine is immediately available for chlorination of further quantities of the sponge. Thus, the issuing gases have been separated into nickel chloride, iron oxide, and cycling chlorine. From time to time, the nickel chloride may be individually contacted with hot oxygen or air, whereby it is also is metathesized to nickel oxide and chlorine and the latter may also be used in cycle. The ultimate products, then, are nickel oxide, iron oxide and cycling chlorine. It is also possible to separate the iron chloride by cooling below 200 degrees C.

If other metals and metalloids are present, their action depends upon the course of the pre-reduction treatment and upon the temperatures employed in the chlorination chamber and in the fractional condensation chambers. Manganese has a peculiar behavior in that it chlorinates with fair rapidity over a range from 300 degrees C. to 700 degrees and over, but evolves slowly at such temperatures, and usually appears throughout the length of the fractional condensation chambers, having apparently no definite temperature of deposition. The time factor is hence of great importance in determining the evolution of manganese as chloride. If the manganese remains in the oxide form, however, and but little carbon is present in the sponge, the actual quantity of manganese chloride which passes over is small. In fact, when it is sought to manufacture certain types of rustless chromium-nickel steels, it is recommended to incorporation further manganese.

The chromium content is substantially unaffected in the sponging operation, and practically no chromium evolves as a chloride at temperatures below 700 degrees. Above 700 degrees, a certain amount of chlorination proceeds, especially if carbon is present, and at 900 degrees not exceeding about 20 percent of the chromium is driven over as a volatile chloride during a controlled treatment of the above type. It may easily be separated by a fractional condensation ahead of the nickel chloride.

As stated above, the silicia and alumina are substantially unaffected at the temperatures involved, so long as the quantity of carbon is restricted.

It will be understood that a preferred manner of proceeding is to maintain an excess of chlorine at all times, as this appears to have an advantageous effect in preventing retention of ferrous chloride in the residue, or its separation from the evolved vapors.

*Example II*

The procedure of Example I may be followed while using the laterite ore or a Canadian iron-nickel ore, by employing two heating chambers shut off from one another, with the sponge passing from one chamber to the other. The chamber to which the sponge initially passes may be maintained at a temperature of between 300 and 500 degrees C., and chlorine is passed through it as before. This chlorine produces a definite chlorination of the iron and nickel, present in elemental form, and an evolution of a major portion of the ferric chloride occurs. Nickel chloride is substantially unaffected by the temperature. Upon passing to the second chamber, maintained at a temperature of 800 to 900 degrees C., further ferric chloride and the nickel chloride are evolved. The fractional condensation of the vapor issuing from the second chamber may be accomplished as before, the ferric chloride passing from the deposit chamber for nickel chloride and being combined with the ferric chloride evolved directly from the first furnace chamber. By regulating the temperature within the condensation chamber for the nickel chloride, however, definite quantities of iron chloride may be deposited therein, so that the combined iron and nickel chlorides may then be converted and smelted to produce nickel-iron alloys, or used for a combination with other materials to produce alloys having definite concentrations of nickel and iron.

*Example III*

The procedure is likewise of value with certain ores of Russian origin which have so much gangue that the ores cannot be directly smelted. A typical ore of this nature is one which contains 20 percent if iron, 1.2 percent of nickel, 0.2 percent of cobalt, 0.9 percent of chromium, 50.9 percent of silica, 1.67 percent of alumina, along with other metals and metalloids. Such an ore usually contains around 20 percent of moisture, which is removed by a drying or calcining operation, and then the ore is subjected to treatment with chlorine at a temperature of 800 to 900 degrees C. in the presence of carbon as a reducing agent. Substantially all of the iron and nickel values are thus evolved as chlorides, while the gangue is substantially unaffected. The mixed metal chloride vapors are then subjected to a fractional condensation to recover the nickel. When the nickel deposition chamber is maintained at temperatures between 800 and 500 degrees from its inlet to its outlet, the chloride deposit therein contains 1 or 2 percent of the total iron and about 60 percent of the total nickel of the original ore; while substantially no nickel is lost with the issuing chloride vapors containing ferric chloride and traces of aluminum and silicon chlorides. The content of chromium, in this instance, is low and the value of its separation depends upon economic conditions. The residue may be discarded.

This type of treatment is likewise valuable with Canadian or Korean ores which contain iron, nickel and cobalt. The possibility of fractionally condensing the nickel during the same operation as that employed for removing it from the ore renders the procedure directly effective with such matters.

*Example IV*

The possibility of controlling the elimination of iron from ores and like matters in this manner is also of value with materials which contain the iron substantially as an impurity, such as bauxites, clays, greensands, etc., which are to be purified and employed for their contents of silica and/or alumina. The controlled reduction and chlorination at a low temperature, whereby the iron and like metals are converted to chlorides; followed by the exposure to a temperature of, say, 800 to 900 degrees C., for the elimination of the chlorides formed, in the substantial absence of carbon or like reducing agent and in the presence of an excess of chlorine; makes it possible to purify such materials with respect to iron successfully. As brought out above, the presence of chlorine and the absence of reducing agents permits the conversion of the iron to ferric chloride without being accompanied by any serious conversion of the aluminum or silicon to volatile chloride form. Hence the chlorine is employed effectively and the evolved chlorides may be burnt at their high temperature, and the chlorine cycled as set forth above.

These several examples indicate the feasibility of removing iron as volatile ferric chloride at temperatures up to 900 degrees, without substantial conversion and concurrent removal of silica and/or alumina. The preferred procedure is to control the operation by the preliminary sponging. It is, however, feasible to conduct the operation by heating the dried matter with such a reducing agent as carbon, and introducing chlorine. The conjoint action of the carbon and chlorine makes it possible, for example, to remove 90 percent of the iron at 500 degrees C. or less, without any substantial conversion of silica or alumina and with chlorination and not evolution of nickel and cobalt. A later further heating to 800 to 900 degrees then effects an evolution of the nickel and cobalt chlorides, along with a further portion of the iron chloride.

In any instance, it is likewise possible to mix the residue if high in unconverted iron, nickel and/or chromium with selected quantities of nickel and iron values obtained by the fractional condensing operations, and smelt the entire mass to produce an alloy of desired constitution. Further, low-grade ores may be made up by introducing such values from the fractional condensation chambers (preferably after conversion to oxide with recovery of chlorine) and attain products of the desired constitution.

It is obvious that the invention is not limited to the specific examples given, but that it may be employed in many ways within the scope of the appended claims.

Having thus described the invention, what I claim as new and desire to secure by Letters Patent, is:

1. The method of removing and separating iron and nickel from oxide ores containing the same in the presence of gangue, which comprises subjecting the ore to a sponging reduction in the presence of a limited quantity of carbon and at a temperature not substantially exceeding 1000 degrees C., treating the sponged ore with chlorine at a temperature between 200 and 500 degrees C. for effecting a chlorination of elemental iron and nickel and for a time sufficient for the selective elimination of elemental iron as ferric chloride, thereafter heating the sponged ore in the presence of chlorine to a temperature between 700 and 900 degrees C. for completing the chlorination of elemental iron and nickel and for a time sufficient to eliminate the same as mixed ferric and nickel chloride vapors, the quantity of carbon during sponging being so restricted that no substantial amount of carbon is present during the chlorination of the sponged ore removing the mixed chloride vapors and cooling the same to a temperature between 420 and 780 degrees C. for effecting the deposition of nickel chloride therefrom.

2. The method of removing iron and nickel values from matters containing the same in elemental form in the presence of chromite which comprises contacting the matter under anhydrous conditions and in the substantial absence of a reducing agent with chlorine at a temperature between 400 and 500 degrees C. and for a time sufficient for driving off the elemental iron as ferric chloride, collecting the ferric chloride, thereafter heating to a temperature of substantially 900 degrees C. in the continued presence of chlorine and for a time sufficient for driving off nickel chloride while the chromite remains substantially unchanged in the residue by reason of the substantial absence of reducing agent, and collecting the nickel chloride separately from the aforesaid ferric chloride, the heating and chlorine treatment being accomplished in the substantial absence of reducing agent whereby to prevent the reduction and chlorination of chromium in the chromite.

3. The method of removing iron and nickel values from matters containing the same in oxide form in the presence of alumina, silica, and chromium values in oxide form, which comprises reducing at least a major portion of the iron and nickel values to elemental form and at a temperature of substantially 1000 degrees C., contacting the same with chlorine and under anhydrous conditions at a temperature between 400 to 500 degrees C. for a time sufficient to cause elimination of iron as ferric chloride vapors, thereafter heating to a higher temperature not exceeding 900 degrees C. to cause an elimination of nickel as nickel chloride vapors and while restricting the quantity of carbon present for substantially preventing the reduction and chlorination of the alumina, silica, and chromium values, and collecting the vapors separately.

4. The method of removing nickel values from oxide matters containing the same in the presence of alumina, silica, and chromium and iron values, which comprises reducing the nickel and at least part of the iron thereof at a temperature of substantially 1000 degrees C. and contacting the same with chlorine under anhydrous conditions and at a temperature substantially between 400 and 500 degrees C. to cause an elimination of elemental iron as ferric chloride vapor, thereafter heating in the presence of chlorine and substantial absence of reducing agent to a higher temperature not exceeding 900 degrees C. to cause an elimination of the nickel as nickel chloride vapor while retaining the alumina, silica and chromium oxide compounds substantially unchanged, and collecting the vapors separately, while restricting the quantity of a reducing agent present during chlorination whereby to prevent the reduction and chlorination of alumina, silica and chromium values.

5. The method of recovering nickel values from matters containing the same in the presence of chromium and iron values, the nickel and a part of the iron being present in elemental form and the chromium and a part of the iron being in the form of oxide, which includes the steps of contacting the matter with chlorine under anhydrous conditions at a temperature substantially between 400 and 500 degrees C. for a time sufficient to produce ferric chloride from the elemental iron and so that substantially all of the ferric chloride formed is driven off and in the substantial absence of a reducing agent reactive with the iron and chromium compounds, thereafter heating to a temperature of substantially 900 degrees C. in the continued presence of chlorine to drive off nickel chloride while the absence of a reducing agent operates to retain the chromium oxide values substantially unchanged in the gangue, and collecting the nickel chloride.

6. The method of obtaining nickel from an oxide ore or residue containing the same in the presence of iron and chromium values, which consists in subjecting the ore or residue to a heat treatment under anhydrous conditions in the presence of a limited quantity of carbon as a reducing agent at a temperature of substantially 1000 degrees C. for bringing at least major portions of the nickel and iron to elemental form, and thereafter contacting the same with gaseous chlorine at a temperature and for a time sufficient for causing the chlorination of all elemental iron and evolution of ferric chloride vapors while chlorinating but retaining the nickel values substantially unvolatilized, withdrawing the ferric chloride vapors, subjecting the remaining mass to a higher temperature in the continued presence of gaseous chlorine to cause the elimination of all elemental nickel of the reduced ore as nickel chloride vapors and in the substantial absence of reducing agent whereby to prevent the reduction of chromium values, and collecting the nickel chloride vapors.

7. The method of removing a large proportion of the total iron and a predetermined lesser proportion of total nickel from matters containing oxide compounds of iron, nickel and chromium, which comprises subjecting the matter to a sponging reduction at a temperature not substantially in excess of 1000 degrees C. and in the presence of a limited quantity of carbon for reducing the major proportions of both iron and nickel to elemental form while avoiding a reduction of the chromium, the quantity of carbon being limited to avoid the substantial presence thereof during succeeding operations, thereafter contacting the sponged matter with chlorine at a temperature substantially between 400 and 475 degrees C. for a time sufficient for effecting the formation and elimination of ferric chloride from the elemental iron, thereafter heating in the presence of chlorine to a temperature substantially between 700 and 900 degrees C. for provoking the formation and elimination of nickel chloride from the elemental nickel, and ceasing the said heating treatment with chlorine when the nickel content has been reduced to the said predetermined proportion.

CHARLES HART.